May 6, 1958 R. C. MINER 2,833,559
FIFTH WHEEL COUPLER
Filed Nov. 2, 1956
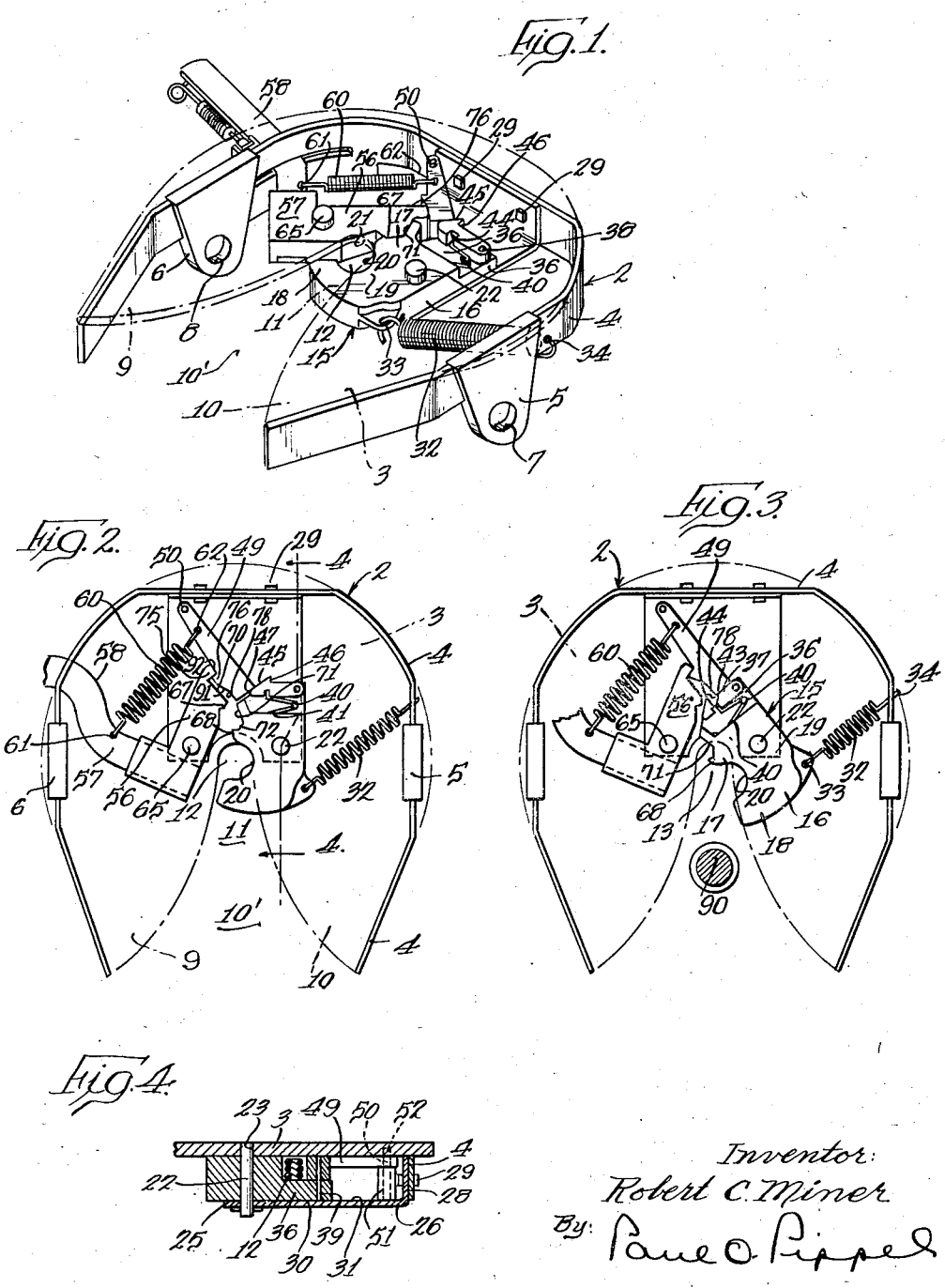
Inventor:
Robert C. Miner
By: Paul O. Pippel
Atty

United States Patent Office 2,833,559
Patented May 6, 1958

2,833,559

FIFTH WHEEL COUPLER

Robert C. Miner, La Grange, Ill., assignor to International Harvester Company, a corporation of New Jersey Application November 2, 1956, Serial No. 619,994

7 Claims. (Cl. 280—434)

This invention relates to couplers for tractor trailer combinations.

A general object of the invention is to provide a novel and improved tractor trailer fifth wheel hitch of the automatic type.

A more specific object of the invention is to provide a novel and improved coupling mechanism wherein the parts may be set either in uncoupling or coupling relationship to permit withdrawal of the associated coupling pin or to interlock therewith without the attendance of an operator.

These and other objects of the invention will become more apparent from the specification and the drawing wherein:

Figure 1 is a perspective view of a fifth wheel incorporating the invention, the top plate portion being shown in phantom lines in order to reveal the mechanism therebeneath;

Figure 2 is a top view of the coupler with parts shown in lockset position preparatory to uncoupling;

Figure 3 is a top view similar to Figure 2 but showing the parts in uncoupled position, and Figure 4 is a sectional view taken substantially on the line 4—4 of Figure 2.

Describing the invention in detail and having particular reference to the drawings, the fifth wheel generally designated 2 comprises a top bearing plate 3 with a peripheral apron or flange 4. There are provided at opposite sides of the plate a pair of depending lugs 5 and 6 with aligned openings 7 and 8 for receiving a cross shaft (not shown) for supporting the fifth wheel on the associated tractor as is well known to those skilled in the art. The plate 3 comprises a pair of rearwardly diverging wings 9 and 10 which define a passageway 10' therebetween for an associated kingpin which is adapted to be guided into a throat 11 which terminates in a center opening 12 which is closed on its forward side and open on its back side 13 (Fig. 3) for egress and ingress of the associated kingpin as hereinafter explained.

The plate 2 supports the coupler mechanism generally designated 15 which comprises a knuckle member 16 or jaw having front and rear leg portions 17 and 18 and an interconnecting bight portion 19 developing a somewhat semi-circular notch 20 for embracing the associated circular kingpin on its back side while the forward side is embraced or surrounded by the forward closed side 21 of the center opening 12 as best seen in Figure 1. The coupling jaw is pivoted on a substantially vertical axis on a pin 22 substantially in transverse alignment with the forward leg 17 where it joins the bight portion 19 that is forwardly of the leg 18 whereby the coupling jaw is swingable with its rear leg 18 across the open side 13 of the center opening 12 of the plate in the locked position of the mechanism and adapted to swing away from the throat 11 in the uncoupled position of the parts whereupon the forward leg 17 swings into the opening 12 from its closed side 21 in the path of an incoming coupling pin whereby the pin rotates the jaw 16 in coupling direction that is clockwise as seen in the drawings to thus couple the mechanism.

As best seen in Figure 4 the upper end of pin 22 projects through an opening 23 in the plate 3 and the lower end of the pin is connected as by welding or by any other suitable means to the under side of plate portion 25 of the combination carrier and guard structure 26 which at the forward end of the plate portion 25, which is substantially horizontal and underlies the entire mechanism, is provided with an upstanding flange 28 by which it is bolted as at 29 to the adjacent portion of the skirt 4.

The jaw member 16 slidably engages on its bottom side 30 with the top side 31 of the plate portion 25. The jaw member 16 is continuously biased in an unlocking or uncoupling direction by a tension spring 32 which at one end is hooked as at 33 to the jaw member 16 at a point substantially in alignment with the leg 18 that is rearwardly of the pivot point 22 and at its other end is connected outwardly of the jaw member as at 34 to an adjacent portion of the flange 4 of the top plate.

The jaw 16 is provided forwardly of the leg 17 with an integral ledge 36 on which is supported a trigger pawl 37 for rotation in the plane of the jaw 16, the pawl being pivoted at one end on the upper end of said pin being secured at its lower end in an opening 39 in the ledge 36.

The pawl 37 is constantly urged in a direction away or forwardly with respect to the jaw member 16 by a torsion spring 40 which has one leg reacting as at 41 against an upstanding forward side 42 of the leg 17 and the other end of the torsion spring has an outwardly bent extremity 43 which fits into a notch 44 in the opposing side of the pawl 37 and reacting against the pawl to urge it outwardly.

The distal end of the pawl is provided with a cam surface 45 on its outer side which terminates at its inner end in a catch 46. In the locked position of the jaw 16, the cam edge 45 is adapted to ride on or engage the end edge 47 of the lockset pawl or dog 49 which is pivoted as at 50 on a pin which is mounted within a boss 51 connected to the plate 25, the upper end of the pin extending into a complementary opening 52 in the plate 3. It will be seen that the boss 51 supports the lockset latch 49 and that the same is swingable in a generally horizontal plane. It will be seen that the lockset latch or dog or pawl 49 is constantly urged toward the locking bolt 56 which is connected to the inner end 57 of the handle 58, the bolt 56 and the handle 58 forming a bellcrank-like structure. A tension spring 60 is stretched between and connected to the inner end 57 of the handle and to the lockset latch 49 as at 61 and 62. The locking member 56 extends forwardly of the pivot 65 of the combined handle and bolt structure, said pivot being in the form of a pin 65 which is journalled in the plate and carried and connected to the portion 25 of the carrier structure at a point opposite that where the pin 22 is disposed with respect to the opening 12. The bolt 56 is swingable toward and away with respect to the jaw and on its side adjacent to the jaw is provided with a projection 67 (Fig. 2) which is adapted to fit behind the extension 68 of the leg 17 and the distal edge portion 70 of the member 56 provides a locking surface or abutment with a complementary locking surface 71 which is formed as a lateral extension on the free end of the leg 17 of the coupling member forwardly of the extension 68 thereof whereby as best seen in Figure 1 when the extension or projection 67 is entered into the pocket 72 (Fig. 2) between the surface 71 and the extension 68 the surfaces 70 and 71 abut and the jaw 16 is prevented from rotating to uncoupling position.

Referring now to Figure 1 in order to set the parts in position preparatory to uncoupling, the handle 58 is rotated counterclockwise whereby swinging the locking member 56 away from the coupling member to a position shown in Figure 2. The outer extremity of the bolt 56 has an outwardly extending catch 75 which over-rides a catch 76 on the lockset member 49, catch 76 being provided intermediate the ends of the member 49 and the catch 75 holding behind to catch 76. The handle 58 is then released and the operator then pulls the tractor from the trailer whereupon the kingpin 90 moves rearwardly and jaw 16 swings to uncoupled position as best seen in Figure 3 withdrawing the leg 18 across the throat portion 11 and disposing the extension 68 into the throat portion and at the same time the trip dog 37 rides with its camming surface 45 against the opposing surface 47 on the lockset latch until the catch 46 enters in front of the opposing edge 78 of the lockset member 49 whereby the catch 46 is engaged with the member 49. Upon recoupling the member 37 swings the lockset member 49 forwardly to disengage the catch 76 thereon from the catch 75 on the coupling bolt attendant to the coupling pin 90 being entered into the throat and moved against the extension 68 of the coupling member 16 so that the coupling member 16 is rotated in a coupling direction. As the member 49 is swung forwardly and disengages the catch 76 from the catch 75 it permits the locking bolt and the handle to rotate in a clockwise direction and advances the bolt 56 toward the coupling jaw whereupon entering the projection 67 into the pocket 72 and the surface 70 engages with the surface 71. At the same time the catch 75 keeps the latch 49 forwardly of the extension lug 71 of the coupling member and in position to engage its edge 47 with the cam surface 45. Also the back side of the catch 76 has a camming surface 91 which engages the back edge 92 of the locking bar 56 urging it into locking position.

I claim:

1. In a tractor-trailer coupler, a fifth wheel with a coupling pin socket having an open side, a coupling jaw pivoted on the wheel at one side of the socket and having first and second leg portions extending from the pivot toward the socket, said jaw swingable to dispose said first leg behind said socket across its open side while withdrawing said second leg from in front of said socket for coupling and vice versa for uncoupling, a locking bar pivotally supported on the wheel at the side of the socket opposite said jaw and having a swinging end movable into engaging position with said first leg in the coupling position of the jaw and swingable to a released position to accommodate rotation of the jaw from coupling to uncoupling position, manual means for swinging said bar to released position, a spring loaded holding latch on said wheel having an elongated arm with a catch intermediate its ends adapted to swing in front of said bar to hold it in released position, a spring loaded trip latch on said jaw biased toward said holding latch and extending lengthwise transversely of said arm and having a cam surface engaging the end of said arm in the coupled position of the jaw, said cam surface adapted to depress said trip latch away from said arm attendant to rotation of the jaw in an uncoupling direction, said trip latch having a catch adapted to engage behind said arm, said trip latch adapted to swing said arm in a direction disengaging the catch on said arm from said bar to accommodate its return to locking position with said jaw and upon further movement with the jaw in its coupling direction said arm overriding the catch on said trip latch and engaging with its end on said cam surface and engaging with its side with the adjacent end of the locking bar.

2. In a coupler, a fifth wheel member having a kingpin socket, a coupling jaw swingably mounted upon said wheel member for movement to coupling and uncoupling position with respect to said kingpin, a lock element swingably supported at one end upon the member and swingable at its other end to locking and released positions with respect to said jaw, movable means for moving said element to release position, a holding latch pivoted on the said member and extending transversely of said locking element, said holding latch having a catch intermediate its ends adapted to catch in front of said lock element for holding it in released position, said holding latch having cam means engageable with said lock element in the holding position thereof for camming the same into holding position, and trip means carried upon said jaw for releasing said latch from its holding position with said element attendant to said jaw being swung to uncoupled position.

3. In a coupler, a fifth wheel member having a kingpin socket, a coupling jaw swingably mounted upon said wheel member for movement to coupling and uncoupling position with respect to said kingpin, a lock element swingably supported at one end upon the member and swingable at its other end to locking and released positions with respect to said jaw, movable means for moving said element to release position, a holding latch pivoted on the said member and extending transversely of said locking element, said holding latch having a catch intermediate its ends adapted to catch in front of said lock element for holding it in released position, and trip means carried upon said jaw for releasing said latch from its holding position with said element attendant to said jaw being swung to uncoupled position, and said trip means comprising a spring loaded latch carried upon said jaw and having a catch adapted to hook behind said holding latch for swinging it away from the lock element attendant to the jaw being pivoted to coupling position.

4. In a coupler, a fifth wheel member having a kingpin socket, a coupling jaw swingably mounted upon said wheel member for movement to coupling and uncoupling position with respect to said kingpin, a lock element swingably supported at one end upon the member and swingable at its other end to locking and released positions with respect to said jaw, movable means for moving said element to release position, a holding latch pivoted on the said member and extending transversely of said locking element, said holding latch having a catch intermediate its ends adapted to catch in front of said lock element for holding it in released position, and trip means carried upon said jaw for releasing said latch from its holding position with said element attendant to said jaw being swung to uncoupled position, and said trip means comprising a dog extending transversely of said holding latch and pivoted on said jaw, and spring means biasing said trip latch toward said holding latch.

5. In a fifth wheel coupling device for vehicles comprising a kingpin on one vehicle and coupling means on the other vehicle which cooperate with the kingpin to couple the vehicles together, said coupling means including a jaw swingable into coupling and uncoupling positions, a locking bar swingable into locking and release positions with respect to said jaw, holding means for releasably holding said locking bar in released position and in locking position, and trip means carried on said jaw formed and arranged to engage said holding means in response to said jaw moving from coupled to uncoupled positions and release said holding means from said locking bar in response to swinging of the jaw from uncoupled to coupled positions.

6. In a fifth wheel coupling device for vehicles comprising a kingpin on one vehicle and coupling means on the other vehicle which cooperate with the kingpin to couple the vehicles together, said coupling means including a jaw swingable into coupling and uncoupling positions, a locking bar swingable into locking and release positions with respect to said jaw, holding means for releasably holding said locking bar in released position, and trip means carried on said jaw formed and arranged to engage said holding means in response to said jaw moving from coupled to uncoupled positions and release said holding means from said locking bar in response to swinging of the jaw from uncoupled to coupled positions, and manual means for moving said locking bar from locked to release positions, and a tension spring extending between said holding means and said locking bar for urging the same into engaging position.

7. The invention according to claim 6 and said holding means comprising an elongated latch member pivoted at one end and having a catch for engaging said locking bar in released position, said catch having a cam surface on its back side for engaging said back side of the bar and camming it into locking position.

References Cited in the file of this patent
UNITED STATES PATENTS 1,929,220  Steinhauer _____ Oct. 3, 1933